ical response. The application protocol buffers the non-computational actions, and invokes a local service to register the actions and to stimulate a user-discernible response. Other actions are forwarded by the protocol to the remote application process in the host computer. The invention reduces the response time to certain user-initiated actions by providing local response facilities, thereby eliminating a time-consuming communication with the remote application process.

United States Patent [19]
Rhyne

[11] Patent Number: 4,901,223
[45] Date of Patent: Feb. 13, 1990

[54] METHOD AND APPARATUS FOR APPLICATION SOFTWARE CONTROL OF ECHO RESPONSE

[75] Inventor: James R. Rhyne, Stamford, Conn.

[73] Assignee: International Business Machines Corporation, Armonk, N.Y.

[21] Appl. No.: 858,470

[22] Filed: Apr. 30, 1986

[51] Int. Cl.⁴ .................. G06F 13/42; G06F 3/14
[52] U.S. Cl. .................... 364/200; 364/228.4; 364/240.8; 364/260.1; 364/264.5; 364/300; 379/95
[58] Field of Search ... 364/200 MS File, 900 MS File, 364/300, 518, 521; 379/95, 96; 235/379, 380

[56] References Cited

U.S. PATENT DOCUMENTS

| | | | |
|---|---|---|---|
| 4,078,249 | 3/1978 | Lelke et al. | 364/200 |
| 4,114,027 | 9/1978 | Slater et al. | 235/379 |
| 4,394,649 | 7/1983 | Suchoff et al. | 364/711 |
| 4,410,940 | 10/1983 | Carlson et al. | 364/200 |
| 4,423,316 | 12/1983 | Sams et al. | 235/379 |
| 4,460,960 | 7/1984 | Anderson et al. | 364/200 |
| 4,513,391 | 4/1985 | Maddock | 364/900 |
| 4,586,035 | 4/1986 | Baker et al. | 340/706 X |
| 4,589,068 | 5/1986 | Heinen, Jr. | 364/300 |
| 4,623,964 | 11/1986 | Getz et al. | 364/200 |
| 4,633,430 | 12/1986 | Cooper | 364/300 |
| 4,649,533 | 3/1987 | Chorley et al. | 370/58 |

OTHER PUBLICATIONS

Fundamentals of Interactive Computer Graphics by James D. Foley, Addison-Wesley Publishing Company, 1984, pp. 54–57 and 218–225.
"The X Window System" by Robert W. Scheifler and Jim Gettys, ACM Transactions on Graphics, vol. 5, No. 2, Apr. 1986, pp. 79–109.
"An Introduction to Operating Systems" by Harvey M. Deitel, pp. 101–117.

Primary Examiner—Thomas C. Lee
Attorney, Agent, or Firm—Baker, Maxham, Jester & Meador

[57] ABSTRACT

Method for controlling the echo of user-initiated actions taken through the input devices of a workstation in a distributed computational system providing application processing services at a site remote to the user. When application services are being used, an application protocol located proximate to the user separates user input actions which do not require application computational response but which do require registration in the system from those actions which initiate events requiring application program computational response. The application protocol buffers the non-computational actions, and invokes a local service to register the actions and to stimulate a user-discernible response. Other actions are forwarded by the protocol to the remote application process in the host computer. The invention reduces the response time to certain user-initiated actions by providing local response facilities, thereby eliminating a time-consuming communication with the remote application process.

6 Claims, 4 Drawing Sheets

METHOD AND APPARATUS FOR APPLICATION SOFTWARE CONTROL OF ECHO RESPONSE

BACKGROUND OF THE INVENTION

This invention relates to providing echo in the form of user-discernible system response to user-initiated actions which require such response within bounded response times. More particularly, the invention is in the field of multi-user systems wherein user access to an application program in a host computer is obtained through workstations remote from the host computer, and responses to certain user actions in the context of an application program are provided by a protocol which is proximate to the user instead of by the remote application program.

The mechanization of modern offices has led to multi-user systems in which a plurality of user workstations are connected to a single host computer that provides application program processing services to one or more of the workstations. Typically, the workstations are geographically distributed throughout an organization and communicate through a centralized communication facility with the host. In order to provide specific application program services to the workstations, the host is typically time-shared among the workstations.

Modern application programs are characteristically event-driven processes in which interaction occurs between the program and the user. In these cases, interaction is most frequently afforded through a workstation terminal that includes a variety of user input devices and a graphical output device such as a CRT. The user inputs commands and parameters to the application program through the input devices and observes the program responses on the screen of the CRT. When described as event-driven, it is understood that the application process waits for a specific user-initiated action before it undertakes a computation based on user input and provides a response to the user via the CRT.

User actions or events may cause computational response from an application program. Such events follow, for example, entry of a command or depression of an ENTER or RETURN key on a workstation keyboard. It is to be understood that other user-initiated actions do not require computational response from an application program. Such actions include entry of characters typed on a keyboard that form a command, implement cursor movement, or signify sectors of a display tableau by highlighting. Most user actions generally do require immediate notification to the user of registration of the current parameter provided by the input device operated by the user.

In order to apprise the user when an action is registered in an interactive system, feedback is provided in the form of user-discernible responses to the actions. Such responses are termed "echoes." The response to a user action requiring computation is provided by the application program as an indication of the outcome of the requested computation. For example, in a spreadsheet program, the application program may provide the outcome of a calculation based on a formula and parameters provided by the user.

The echo response of a system to user-initiated actions is normally provided by an output device at the workstation. Thus, characters entered on a keyboard are echoed to the user by being displayed on the CRT screen, and operation of cursor control through a keyboard or a mouse is echoed by moving the position of a displayed cursor. Other echo responses include highlighting selected commands, movable objects, or "cells" of a CRT display into which a cursor has been moved.

In most prior art systems, the echo response to user action is typically the responsibility of the application program, which acts through a graphic display service to generate a graphics display on a CRT. A typical graphic service is described in Foley and Van Dam, "Fundamentals Of Interactive Computer Graphics," Addison-Wesley, 1982, at pp. 35-90. In most cases, the application program generates low-level descriptions of the composition and location of objects and text to be displayed and passes them to the display service. The display service translates the descriptions into control signals which cause the CRT to display the objects and text at the indicated locations. Updating or changing an object or location as an echo of a user-initiated action thus normally follows a pathway to the application program and back to the display service.

In the remote workstation environment, where the application program is at a distance from the user input devices, display service, and CRT, the roundtrip between the workstation and the host computer where the application program is located can consume a considerable amount of time. Further, in the case where a plurality of workstations access a single host computer, the roundtrip time for the same echo response at the same workstation can vary as a result of contention for host resources.

Lengthy and variable delay between a user-initiated action and an application program response can be tolerated in the case of computation-initiating actions as a necessary concomitant of multi-user system organization. However, in the case of user actions that require no computation, such as text editing, cursor movement, and highlighting, for example, long or variable delay in system response can seriously detract from the efficiency of program utilization. Indeed, the echo response should be immediate or instantaneous. Therefore, a need exists in multi-user systems in which remote workstations access a host computer for application program services to reduce the time used by the system in responding to user-initiated actions that require immediate feedback to the user.

In other graphics processing systems, echoing can be the responsibility of terminal hardware and/or operating system software at the terminal. In the former regard, hardware echoing requires terminal hardware dedicated to a specific application; if another application is desired, another set of terminal hardware must be used.

Operating system echoing is represented by a minicomputer operating system such as UNIX (UNIX is a trademark of Bell Laboratories). In these systems, echoing is typically implemented at a very low level of abstraction in much the same manner as an output device driver. As in the case of hardware echoing, operating system echoing incorporates a set of output-device-specific response functions. This results in a system which, from the standpoint of the application user, is inflexible and extremely difficult to adapt to the needs and proclivities of the user. Such systems are not intended to be alterable at the point where a graphics application program interfaces with the system's graphics processor.

An object of the invention is therefore to reduce the time required for an echo response to be made to user-initiated actions in a distributed multi-user system having a central computer which provides application process services to the distributed users.

SUMMARY OF THE INVENTION

The solution to the problem described in the background section is founded on the observation that echoing or reaction processes can be extracted from a remote application process and located in proximity to the event registration and display support facilities of the system. In this regard, an application protocol is located at a workstation to be proximate to the application program input and display support services. The application protocol receives all user-initiated actions and separates computation-initiating actions requiring application program computation or processing from actions requiring only an echo response. The first type of user actions are forwarded through the system to the application program located in the host computer. The second type of user actions are evaluated by the application protocol to determine the proper echo response and are passed to the display support facilities for echo resolution. It is recognized that some user actions may require both a computational and an echo response from the system. In responding to these actions, the application protocol separates and forwards the portion of the action requiring computational response. The echo portion of the response is activated locally by the protocol.

Further, the extracted echoing processes are functionally located in the workstation at the interface between the application process and the local graphics resources. Consequently, the application protocol can be expressed in system terms at a relatively high level of abstraction not dependent upon specific characteristics of the output device providing the echo. This permits the protocol to be easily expressed and constructed, for example, by being remotely programmed at a workstation by the application program. The invention therefore imparts graphics flexibility and adaptability to the application processing context, which are not provided by hardware and operating system echoing.

The invention is expressed as a method for controlling the echo of an application process to user-initiated actions at a man-machine interface in a distributed computational system that has indeterminate length message passing delays. The echo controlled is the reaction to user-initiated actions requiring a direct, user-discernible notification from the system within bounded response times but not requiring computation by the application process. In the method, processes requiring user-discernible echoes within bounded response times but not requiring computation by an application process are extracted from their counterpart application processes. The extracted processes are located in proximity to input and display support facilities of the system and linked directly to these facilities and to the application process. Input parameters descriptive of user actions are passed from the input facilities to the extracted processes within a first interval. The echo response required to the input parameters is ascertained by the extracted processes within a second interval. Parameters from the extracted processes are passed to the display support facilities for echo resolution within a third interval. Finally, other parameters are passed from the extracted processes to the remaining application processes.

Alternatively, the invention is a system for controlling the echo response of an application process to user-initiated actions at a man-machine interface in a distributed computational system in which the application process is separated from the interface by a message pathway that imposes indeterminate length message passing delays between the application process and the interface. The system includes a display for providing visual outputs from an application program to a user and a display service responsive to application program output parameters for operating the display. One or more input devices provide application program input parameters in response to user actions, and a message exchange service transfers application program parameters between the local system and the computational system. An application protocol process proximate to the display service, the input devices and connected to the input devices, display service and the program exchange service extracts, from input parameters provided by the input devices, input parameters indicative of user action requiring user-discernible response within bounded response times, transfers the extracted input parameters into echo response parameters, and passes the echo response parameters to the display service. The transformation of extracted input parameters into echo response parameters requires computation by an application program.

The above stated objectives and other advantages of the invention will become more apparent when the following detailed description is read in light of the drawings.

DETAILED DESCRIPTION OF THE PREFERRED EMBODIMENT

Figure 1:
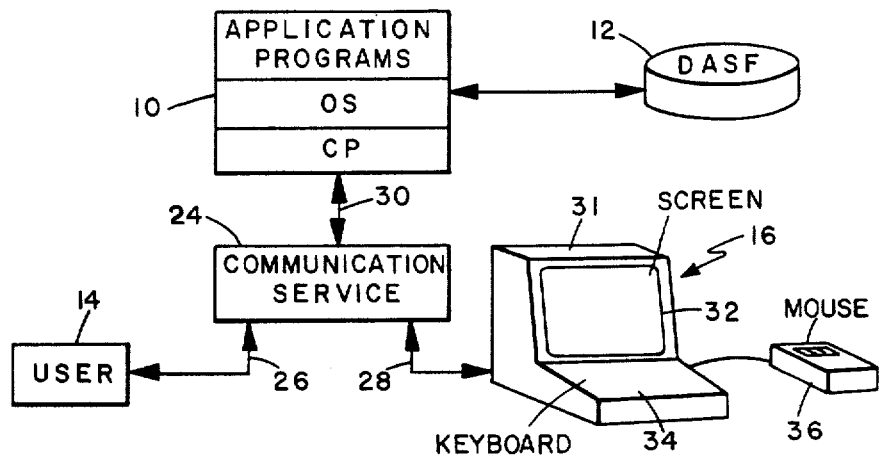
FIG. 1 is a block diagram of a distributed computational system.

In FIG. 1 a distributed computational system includes a host processor 10 which is connected to provide services to a plurality of remotely-located user workstations, two of which are indicated by 14 and 16. The host computer 10 is conventionally configured with a host operating system (OS) that controls execution of application programs stored in the computer. As is known, the operating system may include a control program (CP) that cooperates with the OS to control access to and use of host resources in the execution of application programs stored in the host computer 10. Representative of the OS and CP, respectively, are a UNIX-based operating system, and the Virtual Resource Manager, both available from IBM. Together, these structures are used in a commercially-available IBM multi-user workstation system denoted as the IBM RT/PC.

Preferably, access to the host computer by one of the workstations is provided through a communication service 24 which has transmission paths 26 and 28 to the stations 14 and 16 and a single transmission path 30 to the host computer 10. The communication service 24 can comprise a conventional facility for interconnecting a plurality of remote users to a central processor such as the host 10.

The OS and CP are so structured as to permit the system of FIG. 1 to operate in a mode that allows any number of active users to execute application programs concurrently and to interact with the programs during execution. In this respect, a plurality of application programs, each under the control of one or more users, can be time-interleaved or executed in parallel in the operations of the host computer 10.

For further detail, the resource complement of the workstation 16 is also shown in FIG. 1. The workstation includes a terminal 31 having a CRT display 32 and an alphanumeric keyboard 34. A cursor control input device, commonly called a "mouse," is indicated by 36. The keyboard 34 and mouse 36 are representative of input devices that permit a workstation user to gain access to, and use an application program in the host computer 10 through the distributed computation system of FIG. 1. Alphanumeric keyboards are standard devices that provide input parameters to the system in the form of codes in response to depression of keyboard keys (called "key strokes"). The keyboard can be used for inputting alphanumeric data or commands corresponding to function keys on the keyboard.

The mouse 36 is a conventional locator device which is moved on a surface to provide location and travel parameters for moving a cursor on the screen 32. As is conventional, the mouse 36 includes one or more control buttons which can be depressed for executing such well-known functions as the "pick."

The display screen 32 can comprise any of a host of scanned devices which present to the user graphical information in the form of figures and text.

The minimum complement of input and output devices specified for the workstation 16 of FIG. 1 provide a man-machine interface between the user of the workstation 16 and the system of FIG. 1. It is at this interface that the user selects an application program suited for his present needs and used the input and output devices to communicate with and use the program in an interactive mode.

Figure 2:
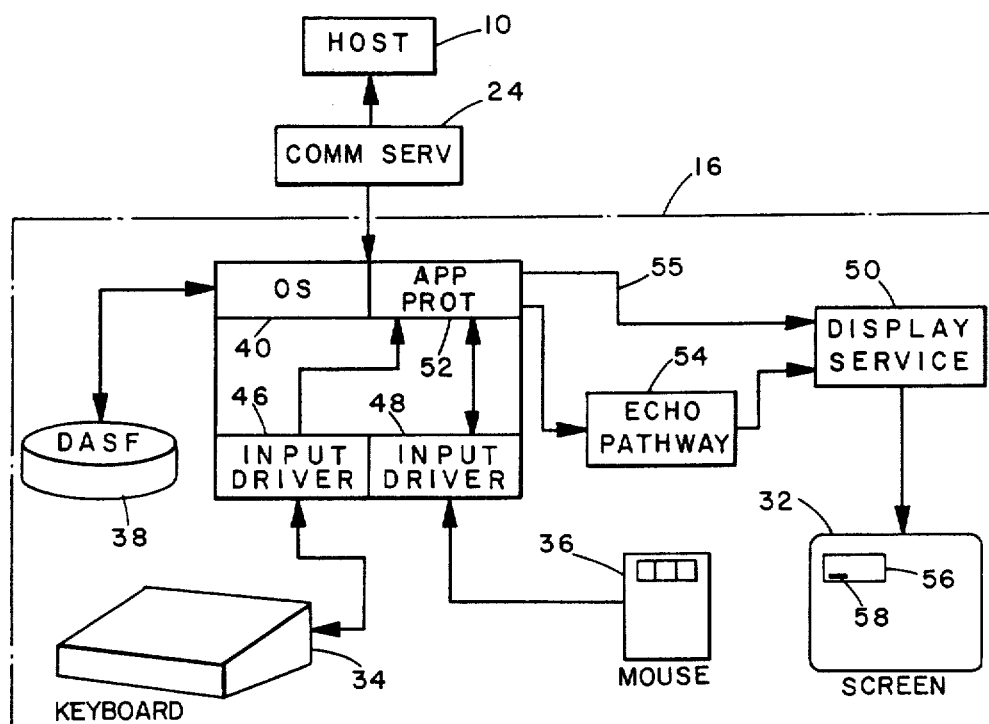
FIG. 2 is a block diagram illustrating in greater detail the major blocks of a workstation in the distributed computational system of FIG. 1.

FIG. 2 illustrates in greater detail the interrelationship of the hardware and software constructs included in the workstation 16. Also illustrated by means of FIG. 2 is the indeterminate message passing delay that so adversely affects application system echo response in the prior art. Finally, FIG. 2 illustrates the interconnection of the invention with the prior art constructs embodied in the workstation 16.

In FIG. 2, the workstation 16 encompasses the display 32, keyboard 34, and mouse 36 already identified in FIG. 1. In addition, a direct access storage facility (DASF) 38, which can comprise, for example, a disk storage mechanism, is also illustrated. These hardware devices are integrated into the distributed computational system by means of workstation software structures, including a software operating system (OS) 40, input drivers 46 and 48, and a display service 50.

The operating system 40 is conventional and can comprise, for example, the UNIX/VRM combination described above. The input drivers 46 and 48 can comprise conventional software processes, which are commonly termed input handlers or drivers. Of course, the input driver 46 translates the physical manipulation of the keyboard by the user into input parameters for an application program in the host computer. Similarly, the input driver 48 converts the manipulation of the mouse 36 and its buttons into application program input parameters.

In the prior art in which echoing is controlled by the application program, system responses, both computational and echoing, are returned from the application program as output parameters, which are fed to a conventional display service 50. The display service is a software construct for converting the output parameters into the control signals that cause the display 32 to present application responses visually to the user.

In the systems employing operating system echoing, the response functions would be in the form of a driver-type software construct responsive to the operating system and located between the operating system and the display 32. Hardware echoing would require a direct echo path connection between the input drivers 46, 48 and the display 32.

In conventional distributed computational system structure, the operating system 40 acts as the parameter interface between the workstation resources and the resources of the host computer 10. In this regard, the operating system 40 would include a construct for message-passing to support data interchange traffic between the workstation 16 and an application program in the host computer 10. The construct also supports message-passing between the local processes in the workstation 16.

Characteristically, communications with the host computer 10 are facilitated by the communication service 24, which also serves all of the other workstations in the distributed computational system. Each workstation encounters an unbounded delay time in exchanging messages with a host computer application program. The delay time can be understood by reference to FIG. 2 where a first delay time $T_1$ is encountered when the workstation 16 has to contend with other workstations for a communications path through the service 24. Next, messages from the workstation that are communicated to the host must compete for host resources. In this regard, the host computer may have a number of different application processes underway in various stages of completion. In order for the messages passed to the application process of interest to the workstation 16 to be processed, the application program must compete with these other host processes for available storage and computational resources of the host computer 10. This contention time is denoted as $T_2$. Finally, the roundtrip for a message and its response from the workstation to the host and back again to the workstation consumes a third time $T_3$. Thus, the total delay between a user-initiated action at the workstation interface and the response the action stimulates from the application program is $T_1+T_2+T_3$. $T_1$ and $T_2$ are indeterminate because it is never certain how many contenders there are for resources. Therefore, when a user-initiated action is taken against the keyboard 34 or the mouse 36, the time for a response to that action to appear on the screen 32 is unbounded.

It should be evident that an indeterminate delay can be tolerated when a user action requires computation or processing, since the application program is at a distance from the workstation 16. However, when the user action requires no computation by the application program and requires only an echo response from the system to confirm the action, the system delay can become intolerable. This is particularly true when the user is moving a cursor by means of the mouse 36 or assembling a command in the form of a character string by using the keyboard 34. In these cases, the user requires immediate confirmation that the system has registered his action so that he can immediately undertake another. For example, if the user is entering a formula by means of alphanumeric keys on the keyboard 34, he will want rapid confirmation of the entry of each keystroke, which will be registered by having the character corresponding to the actuated key appear on the screen 32. Ideally, such response should be virtually instantaneous; desirably, the time of such a response should not vary. In this regard, the echo response should occur within a bounded response time. Obviously, this cannot be achieved if the remote application program does the echoing.

The invention overcomes the indeterminate response time problem of the prior art system by providing an application protocol 52 and an echo pathway 54 representing the connection of echo responses from the protocol 52 to the service 50. In addition, another pathway 55 represents the transfer of application program computation responses to the display service by the application protocol. The application protocol 52 is an independent process that can be downloaded to the workstation 16 at the time that the workstation is initialized with respect to the host computer and an application program at the host is selected. Downloading, or remote programming, is a well-understood process by which the host computer 10, under the control of the selected application program, transmits the interaction protocol as a series of commands to the workstation 16. The workstation operating system can conventionally compile the commands as an independent process and link it to the input drivers 46 and 48 and to the display service 50. The protocol 52 is also linked to the operating system 40, although only for the purpose of communicating with the application program at the host computer 10.

Alternatively, the application protocol can be stored together with other application protocols in the storage facility 38 of the workstation and retrieved when an application program with which it is intended to be used is called at the workstation 16. At this time, the protocol would be retrieved and activated by the workstation OS. In this case, the application protocols can be entered into the workstation 16 by the user, who would employ well-understood programming techniques to make such entry. This would permit the user to tailor the protocols to the user's personal requirements.

As illustrated in FIG. 2, the application protocol 52 receives all application input parameters from the input drivers 46 and 48 and all output parameters provided by the application program in the host computer 10 under the conditions set forth below. In addition, the application protocol passes all output parameters, whether computational or echo responses, to the display service 50.

Figure 3:
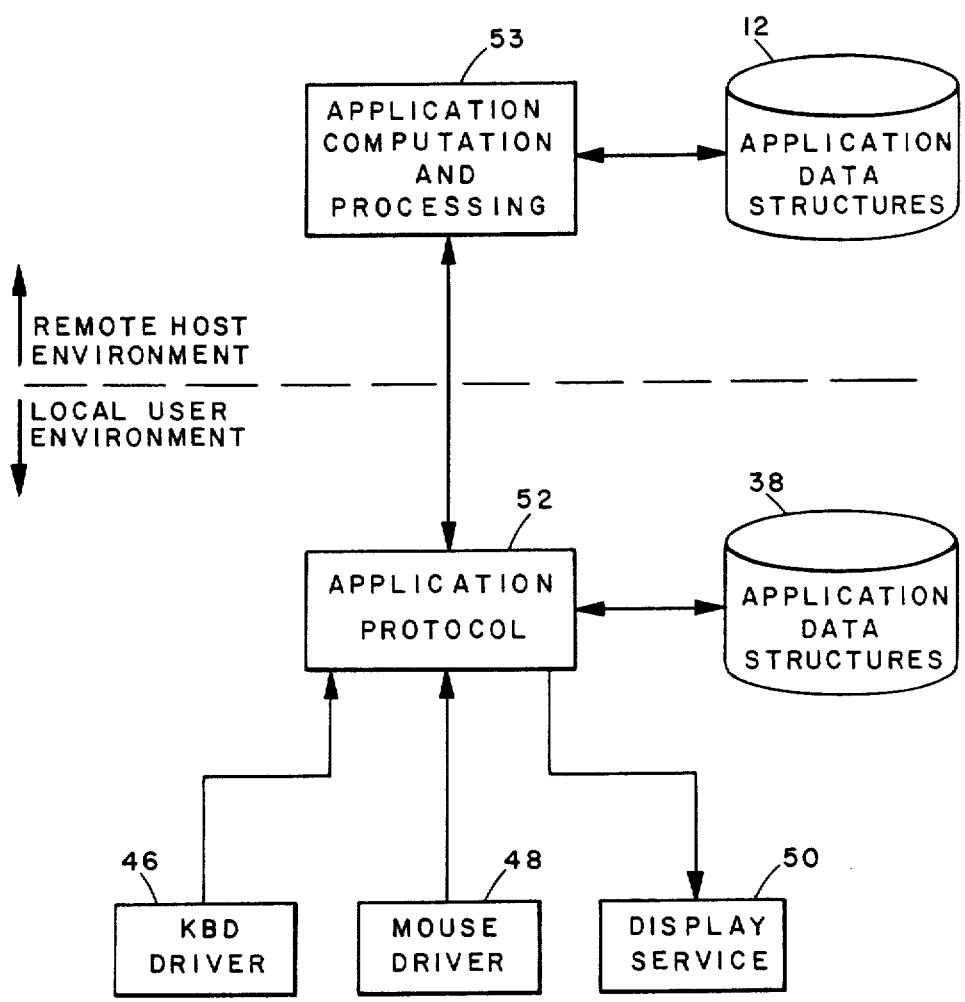
FIG. 3 is a block diagram illustrating distribution of application program processes according to the method of the invention.

Turn now to FIG. 3, which illustrates five independent processes: the two input drivers 46 and 48, the display service 50, the application protocol 52, and an application program 53 in the host computer 10. The processes communicate by conventional message-passing or other equivalent inter-process communication paradigms. Functionally, the application protocol is connected directly to the drivers, the display service, and the application program. According to the invention, when input data is generated by an input device, the associated input driver is activated and will perform certain control functions on its associated input device and extract input parameters and status codes from the device. The input parameters are formatted and communicated to the protocol 52.

The receipt of data from an input driver causes the application protocol process to be dispatched. In this respect, the protocol analyzes status codes and input parameters and either sends parameters across the communication network to the application program in the host computer 10, or sends commands to the display service 50, or both.

The receipt of input parameters for the application program at the host computer 10 will eventually cause dispatching of the application program in the host computer, subject to the above-discussed communication, network, and host resource allocation delays.

It is important to note that the application protocol 52 and application program in the host computer 10 are considered to be asynchronous processes executing in parallel. Parallel execution permits the echoing functions allocated to the protocol 52 to proceed concurrently with and independently of the execution of the application program, insuring the bounded response of the echoing functions. This is important when a user-initiated event requires both a computational response by the application program and an echo response by the protocol 52. This may happen, for example, when a user enters the last character in a character string constituting a command mnemonic: the application program must execute the command, and the user must be notified that the character has been appended to the string. Thus, the protocol 52 provides a branch directly to the display service 50 for the time-critical application response paths and a branch to the application program in the host for application code paths that are not time critical.

Figure 4:
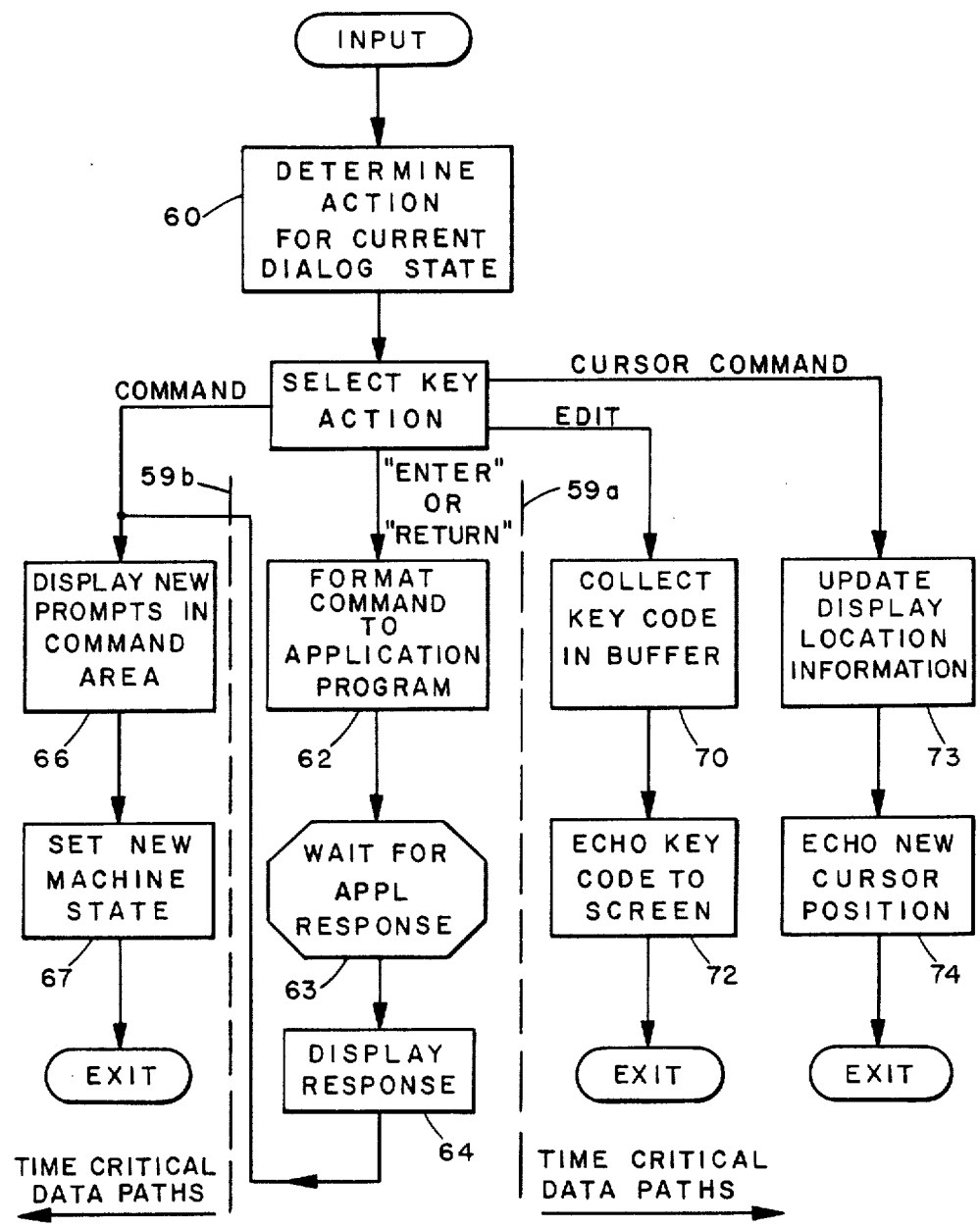
FIG. 4 is a flow diagram illustrating an embodiment of the invention as an application protocol procedure.

In FIG. 4, and in the explanation which follows, it is assumed that the application program selected by the user of workstation 16 is a "spreadsheet" program which displays output parameters for the user's inspection in a multi-dimensional matrix of "cells" on the display 32. (Such a cell is indicated by reference numeral 56 in FIG. 2.) Each cell constitutes a work area used for echoing to the user his progress in inputting and editing data and/or formulas. As is known, the user indicates which particular cell of the spreadsheet he desires to use by moving a cursor (reference number 58 in FIG. 3) to a position on the screen associated with the cell. When the cursor is moved to the cell position, the cell is highlighted, usually by inverting the video signal for the cell. Conventionally, each cell has associated with it data constituting text, or a parameter in the form of a number or formula. When a cell is highlighted, the application program assumes that all user actions following the highlighting are to be taken against the data contents of the cell. Thus, for a highlighted cell, a parameter value or formula can be changed by user operation of the keyboard. Characteristically, spreadsheet programs also provide a status area in the spreadsheet display which contains status area relevant to the highlighted cell. Commands are input to spreadsheet programs by the use of command keys or command mnemonics entered by keyboard. In most cases, the echo to the user of command invocations is provided in the status field of the spreadsheet display. The spreadsheet program typically distinguishes between cell selection and cell content editing on the one hand and command invocation on the other by means of a status code that is set by conventional processing means in response to user actions. When the status code indicates the first set of actions, it is implicit that echo-type responses are to be provided to the user. On the other hand, for the second type of action, computational responses are expected.

FIG. 4 illustrates a flow chart embodying, at a high level, the behavior of the application protocol 52 for a spreadsheet program in response to both types of user actions. The application processing paths which merely cause screen changes (cursor movement, cell highlighting, and text, data, or formula editing) have been extracted from the main body of the spreadsheet application program and placed in the application procedure 52. Since these are the actions for which a bounded response time is required, they are considered to be time-critical data paths and are found on the right-hand side of the dashed line 59a and the left-hand side of the dashed line 59b.

In FIG. 4, the processing paths for actions which cause a re-evaluation of the spreadsheet or some other computation on the spreadsheet to take place are shown between the dashed lines 59a and 59b. However, those parts of these paths which require echoing by the display are extracted into the procedure of the application protocol.

In operation, the procedure of FIG. 4 receives inputs from the keyboard driver 46 and mouse driver 48. Initially, the application protocol will determine, on the basis of the current dialog state (which corresponds to the aforementioned dialog code), the type of action to take in response to keystroke codes provided by the keyboard driver. The machine state can be a conventional data flag having two states in the spreadsheet application context. The first state will indicate when the mouse cursor is currently on a spreadsheet cell, in which case the protocol will interpret keystroke codes as modifying the contents of the cell containing the cursor. Otherwise, if the mouse is inactive and a special command input signal has been received (such as one from the keyboard), the protocol will interpret keystroke codes as commands or command mnemonics.

When determining action in the spreadsheet embodiment, the protocol preferably identifies four kinds of functions, one of which will be assigned to incoming keystroke code parameters; it selected the key action in step 61. In the first function, keystrokes can be regarded as causing recomputation and redisplay of the current spreadsheet tableaux. Conventionally, such a function would be indicated by the code for the ENTER or RETURN key on the keyboard. The second keystroke function path would be associated with keystroke codes identifying a command environment or designating a particular command. For example, it is often the case that the C key of a keyboard indicates a command for copying a formula entered onto a spreadsheet. In these first two keystroke cases, user actions cause re-evaluation of the spreadsheet, or result in some spreadsheet computation being undertaken. In the first case, the actions of the protocol are the three procedure steps contained in the ENTER or RETURN branch of the procedure. In the first step of this branch, the protocol constructs a command for transmission to the application program and sends the formatted command to the application program. This step is indicated by reference numeral 62. In step 63 of the procedure, the protocol awaits a response from the application program to the command. Although this is shown as a discrete step, it is not necessarily the case that the protocol will suspend all operations while awaiting the reply. It would be possible to employ an operating system and protocol constructs that permit the protocol to conduct other processes while the application program is responding to the transmitted command. Whatever message-passing paradigm is employed by the operating system, when the application program response to the transmitted command is received, the protocol will undertake to have the spreadsheet display changed to reflect the response (step 64).

At this point in the procedure of FIG. 4, the actions remaining to complete the ENTER or RETURN branch of the procedure are identical to those taken in response to a keystroke code indicating a command. These steps are indicated by reference numerals 66 and 67.

In procedure step 66, entry of a keyboard command, or completion of an event initiated by application program computation first involves selecting and displaying a new set of prompts to the user in a command area of the spreadsheet display. This is a conventional reaction of an interactive application program to a user-initiated action that causes a change of state in the system. See the Foley and Van Dam reference at pp. 57–59. Following the interactive reaction of the program, the dialog status (machine state) code will be changed to control the protocol response to future input from the mouse or keyboard. After this, the protocol exits and waits for another input.

The third type of action function recognized by the protocol is taken in response to keystrokes which modify or supplement text displayed in the spreadsheet or the associated command and status areas. In this regard, when the mouse cursor is located in a spreadsheet cell, the EDIT function responds to keystrokes code parameters provided by the keyboard driver by changing information in the cell or area. Thus, in the EDIT branch of the procedure, each time a keystroke code is received, the code is collected in a buffer in step 70 and the key code is echoed to the display screen in step 72. Finally, the fourth function involves keyboard cursor commands which move the cursor controlled by the keyboard. It will be evident that the keyboard cursor is distinct and different from the mouse cursor and is used primarily for data entry and editing. The keyboard cursor command protocol function path requires that the protocol respond to keyboard cursor input parameters by updating the location information establishing the point at which the keyboard cursor is displayed and then echoing the new cursor position by changing the position of the keyboard cursor on the spreadsheet display. These two steps are denoted by reference numerals 73 and 74 in FIG. 4.

It should be noted that mouse cursor commands received from the mouse driver 48 will also be echoed by the application protocol in a procedure virtually identical with the CURSOR COMMAND branch of FIG. 4. In this regard, the application protocol 52 receives inputs from the mouse driver 48, determines the action to take in response to the mouse inputs based on the current machine state, and then selected the mouse cursor action. For mouse cursor movements, the application protocol updates the cursor location and echoes the new cursor location by moving the cursor. If the cursor has moved to a new cell location, the protocol obtains the data associated with the new cell, formats the data for display in the cell and status area, and echoes the new cursor position. For a new cell location, the mouse cursor echoing also involves highlighting the new cell corresponding to the updated mouse cursor position, unhighlighting the old cell whence the mouse cursor was moved, and displaying the new cell information.

As shown in FIG. 4, the third and fourth keyboard code action functions and the mouse cursor function follow time-critical data paths in the application protocol. Since the application protocol has been located proximate to the input devices and the output device, the apparent time response of the application program in reacting to these user-initiated action functions is less than that which would be evident if the response was undertaken by the remotely-located application program. Echoing of functions extracted from the application program and localized at the workstation in the form of the application protocol 52 will involve a data routing path having three distinct time intervals. When one of the input devices is operated to produce a time-critical action, the keystroke code parameter will be passed from the input driver to the application protocol in a first time interval. Receipt of the parameter will cause execution of the application protocol by conventional means in the workstation operating system. In a second time interval, the application protocol discriminates the keystroke code or the mouse cursor parameter and executes the appropriate function path in the procedure illustrated in FIG. 4. In the third time interval, the application protocol will send one or more commands to the display service to complete the echo response to the user action by changing the display.

Figure 5:
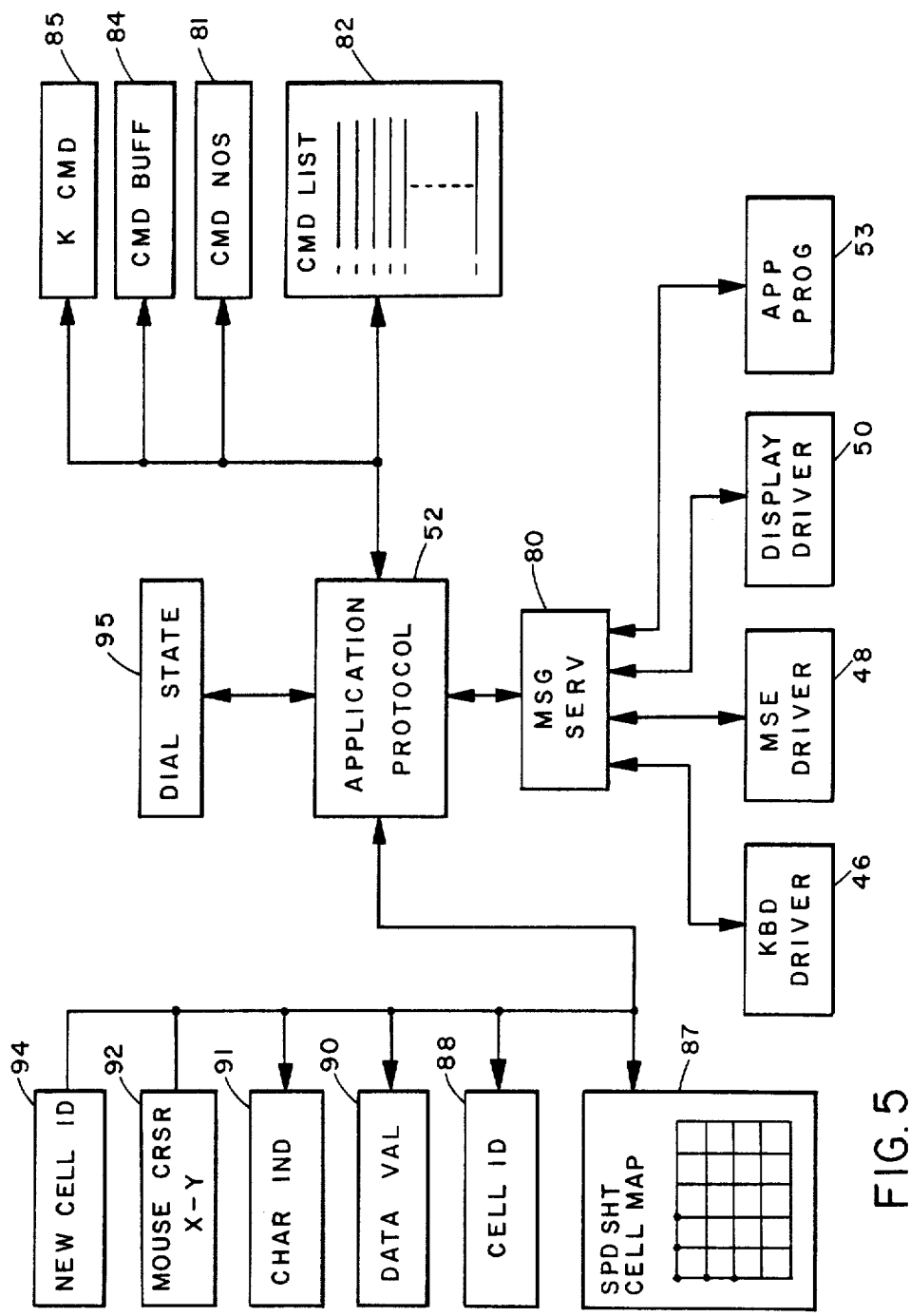
FIG. 5 is an illustration of data structures utilized by the application protocol of FIG. 4.

FIG. 5 illustrates the data and processing structural relationships necessary to support the operations of the application protocol 52 in executing the procedure of FIG. 4 through the specific procedural embodiment contained in the tables below. As shown in FIG. 5, the operations of the application protocol 52 are synchronized with the processing operations of the drivers 46 and 48, the display service 50, and the application program 53 through the facilities of the message service 80. As is known, the message service forms a specific process in the workstation operating system 40. Although a variety of message passing facilities are commercially available, one paradigm is embodied in the ADA Rendezvous technique described in the volume by H. M. Deitel, entitled "An Introduction To Operating Systems." ADA is a registered trademark of the United States Government.

In addition, the application protocol 52 requires access to specific data structures held in the storage facility 38 of the workstation 16. The data structures include a list of commands (CMD LIST) 82 that is stored in conventional look-up table format in which each valid command has associated with it a unique command index. A command buffer (CMD BUFF) 84 is provided into which command characters entered on the keyboard are held. Data is placed in the command buffer 84 when the machine state indicator indicates a command is being entered and the user enters a command mnemonic via the keyboard. A command count field (K CMD) 85 keeps track of the number of commands on the command list 82 that correspond to the command mnemonic represented by the character string held in the command buffer 84. The list of command indices corresponding to the character string in the command buffer is kept in CMD NOS 81.

With regard to the spreadsheet display data structures, the application protocol 52 has access to a spreadsheet (SPDSHT) cell map 87 which can comprise a conventional tabularized data structure containing the value and formula associated with each non-empty cell in the displayed spreadsheet. The spreadsheet cell map is constructed to be indexed by the position of each cell in the spreadsheet display. Thus, the table entry for any particular cell is accessed by its display coordinates and contains the data, parameter values and the formula for the cell. The identification of the currently-highlighted spreadsheet cell is held in a data field labelled CELL ID, which is indicated by reference numeral 88. The data contents of the cell denoted by the entry in the CELL ID parameter 88 are held in the data field labelled DATA VAL and indicated by reference numeral 90. The position of the keyboard cursor (CHAR IND) is in the field indicated by 91. The mouse cursor position X-Y coordinates are in data field 92. Finally, the identification of the cell to which the mouse cursor has just been moved (NEW CELL ID) is in data field 94.

The application protocol 52 accesses the data structures illustrated in FIG. 5 by conventional data resource management means in the working station operating system.

A specific code implementation of the application protocol 52 illustrated in FIGS. 2-5 is given in Tables I through IV. Tables I through IV constitute PL1 code listings that will be understood by those in the art as defining specific procedures that embody the application protocol 52 of FIG. 4.

TABLE I

```
/* Example Application Protocol Procedure for Spreadsheet */
DCL applic_id FIXED BIN (31); /* indentifier of application process */
DCL ap_id FIXED BIN (31), /* id of application protocol test */
    kbd_id FIXED BIN (31), /* identifier of keyboard task */
    mouse_id FIXED BIN (31), /* identifier of mouse task */
    msg_id FIXED BIN (31), /* identifier of received message */
    sender_id FIXED BIN (31), /* identifier of message sender */
    msg_ptr POINTER, /* pointer to message text */
    dial_state FIXED BIN (31), /* 1 - commands; 2 - cell data entry */
    cmd_list (32) CHAR (32) VAR,
                    /* list of possible commands from abbrev */
    cmd_buf CHAR (32) VAR,
                    /* current command input characters */
    k_cmd FIXED BIN (15), /* number of cmds in cmd_list */
    cmd_nos (32) FIXED BIN (15),
                    /* indices of cmds in cmd_list */
    app_msg_id FIXED BIN (31), /* id of message to application */ /
    cell_id FIXED BIN (31), /* identifier of spreadsheet cell */
    data_val CHAR (32) VAR,
                    /* data contents of spreadsheet cell */
    char_ind FIXED BIN (15),
```

TABLE I-continued

```
            /* text cursor position in cell */
    current-x FIXED BIN (15),
            /* mouse cursor position on the screen */
    current__y FIXED BIN (15),
            /* mouse cursor position on the screen */
    new__cell__id FIXED BIN (31),
            /* id of cell cursor just moved to */
    1 applic__msg BASED, /* structure of message from application */
        2 applic__code FIXED BIN (15), /* message code */
    1 kbd__msg BASED, /* structure of message from keyboard task */
        2 kbd__char CHAR (1), /* keyboard code */
    1 mouse__msg BASED, /* structure of message from mouse task */
        2 mouse__button__1 BIT(2), /* '00' B - no button change */
        2 mouse__button__2 BIT (2), /* '01' B - up transition */
        2 mouse__button__3 BIT (2), /* '10' B - down transition */
        2 mouse__x FIXED BIN (15), /* delta x */
        2 mouse__y FIXED BIN (15), /* delta y */
    1 app__cmd__msg, /* structure of application command */
        2 app__cmd CHAR (30) VAR, /* command string */
    1 app__data__msg, /* structure of application data msg */
        2 app__data__id FIXED BIN (31), /* id of spreadsheet cell */ tem */
        2 app__data__val CHAR (30) VAR, /* cell text */
    CALL MYID(pp__id); /* system function returns id of this process */
    CALL SYSID('KEYBOARD', kbd__id);
            /* system function returns name of keyboard task */
    CALL SYSID ('MOUSE', mouse__id);
            /* system function returns name of mouse task */
    dial__state = 1; /* initially command input */
    current__x = 0; /* initial mouse cursor position at origin */
    current__y = 0;
```

Referring now to Table I, a series of declaration statements (DCL) establish variables in data structures and set up the structural context for the messages passed and received by the application protocol. Thus, identifiers are established for the application program 53, the application protocol 52, the keyboard driver 46, the mouse driver 48, for received messages, and for a message sender. For the sake of the spreadsheet application example, it is assumed that the message service 80 queues incoming and outgoing messages in conventional linked-list format in which a message pointer (msg_ptr) points to the location of the identified message. The dial_state structure indicates that the workstation 16 is in a command mode when the value 1 is stored, and denotes non-command status by the value 2. The command list 82, command buffer 84, and command counter 85 are all declared in Table I. The indices of the command in the command list 82 have a declared data structure (cmd_nos). Messages transferred to the application program by the application protocol have an identifier (app_msg_id). The cell space ID 88, data space VAL 90, CHAR IND 91, mouse cursor 92 (current space x, current space y) and NEW CELL ID 94 data structures are all declared in TABLE I. Message structures and codes for application, keyboard, mouse, application command, and application data messages are all defined in TABLE I. Finally, the application protocol 52 is initiated by obtaining its own identification and identifications for the keyboard and mouse drivers from the system (CALL MYID, CALL SYSID ('KEYBOARD'), CALL SYSID ('MOUSE')). The dial state is initialized to 1, implying that the application protocol 52 will initially expect keystrokes to be command inputs. The initial position of the mouse cursor is placed at the lower left-hand corner of the display screen, that is, at the two-dimensional origin of the spreadsheet display.

In the tables which follow, the application protocol exchanges messages with the device handlers, the display service, and the application program. Messages are transferred by the following called functions: GETMSG, ACCMSG, REJMSG, and SENDMSG. The GETMSG routine will obtain a message from a queue of input messages, while the ACCMSG will provide a handshaking acknowledgment to the transmitter of the obtained message if the message is accepted. If the message is rejected, the application protocol will call REJMSG to provide a negative acknowledgment of message receipt. For transferring messages to the display service or application program, the application protocol will call the SENDMSG function to have the message service send the message to an identified process. For the purposes of echoing to a user the user's input actions, the application protocol will call specific functions that are executable by the display service 50. These functions include HILITE CELL and UNHILITE CELL; DISPLAY CURSOR and DISPLAY FIELD; and CMD HILITE. The first pair of commands cause the display service software to control the highlighting of a spreadsheet cell. A spreadsheet cell is highlighted when the mouse cursor is moved into it or unhighlighted when the cursor is moved from it. The second pair of display service commands cause the display service software to display the text cursor in a cell and to display what the user is entering as the contents of the cell, respectively. Finally, the CMD HILITE commands the display service to highlight a command selected from a displayed list of commands.

TABLE II

```
DO WHILE ('1'B);   /* main loop to receive messages from keyboard */
                   /* and application */
    CALL GETMSG(msg__id, sender__id, msg__ptr);
    SELECT (sender__id);
        WHEN (applic__id) DO;
            /* process messages from the application */
```

TABLE II-continued

```
IF msg_ptr->applic_code = terminate THEN LEAVE;
SELECT (msg_ptr->applic_code);
    /* process messages from application */
    . . .
    END
CALL ACCMSG(msg_id);
END;
```

The listing in Table II constitutes the initial part of a loop by which the application protocol obtains messages queued up for delivery to it by the message service 80. A message is obtained by the GETMSG function, which returns to the application program the identification of the message and the message's sender and the pointer to the message location. Based upon the identification of the originator of the message, the application protocol will take specific action. In particular, if the message originator is the application program (WHEN (applic_id)) and the message contains an application code defined as terminate (applic_code=terminate), the application protocol will cease its functions by the standard LEAVE procedure. Otherwise, the SELECT function will cause the protocol to process application messages and signal their acceptance by the ACCMSG function.

TABLE III

```
310    WHEN (kbd_id) DO;
           /* process keyboard messages */
311        SELECT (dial_state);
312          WHEN (1) DO; /* State 1 is initial command state */
               /* user can type command abbreviations */
313            IF msg_ptr->kbd_char = enter_char
314              THEN DO;
                   /* look for current commands in list */
315                CALL find_cmd (cmd_list, cmd_buf, k_cmd, cmd_nos)
316                IF k_cmd = 1 /* command unambiguously identified */
317                  THEN DO;
                       /* highlight the selected scommand */
318                    CALL cmd hilite(cmd_list, cmd_nos, k_cmd);
                       /* move command string to application cmd msg */
319                    app_cmd_ptr->app_cmd = cmd_list(cmd_nos(k_cmd));
                       /* send the message to the application */
320                    CALL SENDMSG(applic_id, app_cmd, app_msg_id);
321                  END;
322                ELSE DO; /* command not unambiguously identified */
323                    CALL USERERR('Two or more commands selcted');
324                  END;
325                END;
326              ELSE DO;
                   /* append new character to command string */
327                cmd_buf = cmd_buf msg_ptr->kbd_char;
                   /* search the command list for matching commands */
328                CALL find_cmd (cmd_list, cmd_buf, k_cmd, cmd_nos)
                   /* highlight the selected commands */
329                CALL cmd_hilite(cmd_list, cmd_nos, k_cmd);
330              END;
331            END;
332          WHEN (2) DO; /* State 2 is data entry in spreadsheet cell */
333            SELECT (msg_ptr->kbd_char)
334              WHEN (enter_char) DO;
                   /* fill in field data in application data message */
335                app_data_id = cell_id;
336                app_data_val = data_val;
                   /* send field id and new field data to application */
337                CALL SENDMSG(applic_id, app_data, app_msg_id);
338              END; /* of WHEN (enter_char) DO */
339              WHEN (del_char) DO;
340                data_val = SUBSTR(data_val, 1, char_ind)
                              SUBSTR(data_val, char_ind+1);
341                CALL display field(cell_id, data_val);
342              END; /* of WHEN (del_char) DO */
343              WHEN (backspace) DO;
344                char_ind = min(1,char_ind-1);
345                CALL display_cursor(cell_id, char_ind);
346              END; /* of WHEN (backspace) DO */;
347              WHEN (forwardspace) DO;
348                char_ind = MAX(LENGTH(data_val)+1, char_ind+1);
349                CALL display_cursor(cell_id, char_ind);
350              END; /* of WHEN (forwardspace) DO */
351              OTHERWISE DO; /* assume alpha character */
                   /* insert the character at the cursor position */
352                data_val = SUBSTR(data_val, 1, char_ind)
                              msg_ptr->kbd_char SUBSTR(data_val, char_ind);
                   /* echo the new field contents */
353                CALL display field(cell_id, data_val);
                   /* move the cursor to the right one character */
354                char_ind = char_ind + 1;
```

TABLE III-continued

```
        /* echo the new cursor position */
355     CALL display cursor(cell_id, char_ind);
356     END;
357     END; /* of SELECT (msg_ptr->kbd_code); 
358     END; /* of WHEN (2) DO */
  ...
359     END; /* of SELECT (dial_state) */
360     CALL ACCMSG(msg_id); /* accept this message - end rendezvous */
361     END; /* of WHEN (kbd_id) */
```

Table III constitutes a continuation of the loop initialized in Table II for the case when a dequeued message is from the keyboard (kbd_id). When a keyboard message is received, the application protocol first determines the dialog state by the SELECT (dial_state) step. If the dialog state value in the dial state parameter is 1, the application protocol will regard keyboard inputs as either command mnemonics, if a command key is not struck, or as commands if the command key is struck. In the explanation following, it is assumed that each keyboard message is dispatched by the keyboard driver 46 in response to a single keystroke. In the portion of the loop including statements 313-325, each character code is inspected to see whether it corresponds to the index of a command on the command list 82. Thus, the IF statement 313 takes the message pointer from a keyboard message and obtains the code for the keyboard character to see whether it corresponds to the code for the ENTER key. If the ENTER key has been depressed, then the procedure in statement 315 calls a FIND COMMAND function which is understood to be a procedure constructed to compare the contents of the command buffer 84 against the entries on the command list 82 to determine whether there is a match. Each time the character string in the command buffer matches an entry in the command list, the contents of the command counter (k_cmd) 85 are incremented. When the called routine returns to the application protocol 52 in statement 316, the protocol inspects the command count buffer to determine whether more than one command has been matched to the contents of the command buffer. If only one match is made (statement 316), then the command is considered to be unambiguously identified and the CMD HILITE command of the display service 50 is called in statement 318 to highlight the matched command. This constitutes the echo of the command invocation to the user. Next, in statement 319, an application message is constructed including the index of the invoked command and the contents of the command count data field. The message service 80 is called in statement 320 to send the message to the application program.

In the event that the command count field contains a value higher than 1, the protocol proceeds from statement 316 to statement 322 under the assumption that two or more commands on the command list correspond to the current contents of the command buffer. This will cause an operating system function USERERR to be called, which will result in a message being produced on the spreadsheet display indicating that two or more commands have been selected.

Returning to statement 313, if the message contents don't correspond to the ENTER key code, a branch is taken to statement 326. In statements 326-330, the application protocol will add the key code contained in the current message to the command buffer by the concatenation statement of 327. Here it can be seen that the contents of the command buffer include a character string called the command string. The call statement 328 constitutes a scan of the command list to determine whether the current contents of the buffer correspond to a command list entry before an ENTER code is detected. If the call statement 328 results in matching the contents of the command buffer to a command list entry, then the CMD HILITE process of the display service will be called in statement 329. Otherwise, the application protocol by the END statement 331 returns to the general message search procedure.

In the event that a keyboard message is received and the machine state is set to state 2, the application protocol will branch from statement 311 to 332, and assume that keystrokes are for the purpose of editing highlighted cell contents or moving the keyboard cursor. In statement 333, the protocol interprets the keyboard character. In this case, when the ENTER key is struck, the SELECT statement of 333 will branch to statement 334. Here, the application protocol assumes that the user has finished constructing a data string to be placed in the currently-identified data cell. In this respect, the data string is in the data value field 90 and the designation of the cell in the cell ID field 88. These two pieces of information are formed into an application message in steps 335 and 336 and the message is sent to the application by means of the SENDMSG function called in statement 337.

If the application protocol, as a result of the SELECT statement 333, determines that the key code corresponds to the DELETE key, it will branch to the listing portion including statements 339-343 to delete the character currently underlined by the keyboard cursor by means of the deletion procedure defined by statement 340. Once the code for the underlined character has been extracted from the data value field 90, the application protocol in statement 341 calls a display service routine for displaying the adjusted contents of the data value field in the currently-highlighted cell. This constitutes the echo of the DELETE function invoked by the user.

Keyboard cursor movements are echoed to the user in the portion of the protocol including statements 343-350. The backspace function is echoed to the user by statements 343-346, while the forward space function is echoed in statements 347-350.

If the current keyboard message does not contain a character code for the ENTER, DELETE, BACKSPACE, or FORWARDSPACE keystrokes, the application protocol will branch from statement 333 to statement 351. In statements 351-357, the application protocol will assume that the character code is for an alphanumeric character and insert the character at the current keyboard cursor position. This is done by adding to the character string in the data value field (statement 352), echoing the addition of the character to the characters already displayed (statement 353), advancing the cursor position value to the right by one character space (statement 354), and echoing the movement of the cursor by calling a display service DISPLAY CURSOR function (statement 355). This ends the portion of the application protocol that echoes keyboard actions by the user. When the keyboard message has been successfully read and executed, the handshake acknowledgment will be returned to the keyboard driver by the ACCMSG function called in statement 360.

program by way of a message constructed and transmitted in statements 427–429. Once the message has been passed to the message service 80, the previous cell is unhighlighted in statement 430. Unhighlighting the previous cell is the first phase of the echo response provided to the user in reaction to movement of the mouse cursor from one to another spreadsheet cell.

The second phase of echoing mouse cursor move-

TABLE IV

```
420   WHEN (mouse_id) DO;
      /* process mouse messages */
      ...
421   IF msg_ptr->mouse_x¬= 0 msg_ptr->mouse_y ¬= 0 THEN DO;
      /* if the mouse has moved, find its new position */
422       current_x = current_x + msg_ptr->mouse_x;
423       current_y = current_y + msg_ptr->mouse_y;
          /* get the field id now pointed to by the mouse cursor */
424       CALL field_id(current_x, current_y, new_cell_id);
          /* has the cursor changed cells in the spreadsheet */
425       IF new_cell_id¬= cell_id THEN DO;
426           IF cell_id¬= 0 THEN DO;
              /* if the cursor was previously on a cell */
              /* fill in field data in application data message */
427               app_data_id = cell_id;
428               app_data_val = data_val;
              /* send field id and new field data to application */
429               CALL SENDMSG(applic_id, app_data, app_msg_id);
              /* turn off highlight for previously selected cells */
430               CALL unhilite_cell (cell_id);
431           END; /* of IF cell_id ¬= 0 THEN DO */
432           IF new_cell_id ¬= 0 THEN DO;
              /* cursor is now on a cell, get the cell value */
433               CALL get_field_val (cell_id, data_val);
              /* set the cell cursor position to first character */
434               char_ind = 1;
              /* get text entered in current cell */
435               CALL get_cell_val (cell_id, data_val);
              /* turn highlighting on for this cell */
436               CALL hilite_cell (cell_id);
437           END; /* of IF new_cell_id¬= 0 THEN DO */
438           cell_id = new_cell_id;
439       END; /* of IF cell_id¬= new_cell_id THEN DO */
440   END; /* of IF mouse_x¬= 0 mouse_y¬= 0 THEN DO */
441   CALL ACCMSG(msg_id)
442   END; /* of WHEN (mouse_id) */
443   OTHERWISE DO;
      /* message from unknown sender, reject it */
444       CALL REJMSG(msg_id);
445   END; /* of OTHERWISE */
446   END; /* of SELECT */
447   END; /* of DO WHILE processing loop */
448   END; /* of PROCEDURE */
```

Table IV includes the application protocol code statements for echoing mouse cursor movements to the user. Mouse messages are identified in statement 420. For the purposes of this explanation, it is assumed that messages from the mouse driver 48 contain only positional change information in the form of delta$_x$ and delta$_y$ values. The application protocol in statements 422 and 423 adds the delta$_x$ and delta$_y$ values to the current x and y values held in the mouse cursor position field 92. Next, in statement 424, the updated mouse cursor position values are used to access the spreadsheet cell map 87 to determine whether the cursor has been moved to a new cell. The function called in statement 424 returns both the current x and y values and the identification of the new cell in the new cell ID field 94. The protocol compares the new cell ID to the current cell ID in statement 425. If the values differ, it is assumed that the cursor has been moved to a new cell. Then, in statement 426, the protocol determines whether the cursor was previously on a spreadsheet cell by inspecting the contents of the cell ID data field 88. If the cursor was previously on a cell, the data and identification of the previous cell are sent to the application ment is accomplished in statements 432–439. In statement 432, the new cell identification is inspected and, if not 0, the cell data and cell ID are retrieved from the cell map 87 and entered into the data fields 88 and 90, and the keyboard cursor is set to the first character in the cell data by statements 433 and 434. Statements 435 provides the character string representing the cell data and the keyboard cursor position to the display service 50. The cell is highlighted by statement 436, thus completing the echo response to the user. Statement 438 moves the new cell ID into the current cell ID field 88. Mouse driver messages are accepted by the call of statement 441. Messages from unknown senders are read and rejected by statements 443–445. The procedures of the application protocol of Tables I-IV are ended in an orderly fashion by the END statements 446–448.

Having thus described my invention, it will be obvious that many modifications and variations of it are possible in light of these teachings, and it is therefore understood that within the scope of the disclosed inven- tive concept, the invention may be practiced other than as specifically described.

I claim:

1. In a distributed computer system including a multiprocessing central processor for concurrently executing a plurality of processes, and a man-machine interface including event registration and display facilities and connected to said central processor by a message pathway interposing indeterminate length message passing delays between said central processor and said man-machine interface, a method for controlling an echo of an application process executing in said central processor to user-initiated actions at said man-machine interface, the user-initiated actions requiring a direct, user-discernible response by the application process within bounded response time, said method comprising the execution by said computer system of the following steps:

providing selection from said man-machine interface of an application process to be executed;

extracting from said application process those processes which provide substantially immediate, user-discernible echo responses within bounded response times;

locating the extracted processes in proximity to said event registration and display support facilities;

providing input parameters for said application process from said event registration facility, said input parameters including first parameters indicative of a use of said event registration facility requiring a substantially immediate, user-discernible echo response to said use by said display support facility, and computation parameters indicative of user actions requiring computation by said application process;

passing said input parameters from the event registration facility to the extracted processes within the first interval;

ascertaining by means of the extracted processes and in response to said first parameters, said substantially immediate, user-discernible echo response within a second interval;

passing said first parameters from the extracted processes to the display support facility for provision of said substantially immediate, user-discernible echo response within a third interval by said display support facility; and passing said computation parameters from the extracted processes to the application process by way of said message pathway.

2. The method of claim 1, further including receiving a response to said computation parameters from said application process at said event registration facility and displaying a command prompt at said display support facility in reaction to said response.

3. The method of claim 1, wherein said first parameters indicate movement of a cursor on said display support facility.

4. The method of claim 1, wherein said first parameters indicate entry of a character at said event registration facility.

5. The method of claim 1, wherein said first parameters indicate entry of a command at said event registration facility.

6. The method of claim 2, wherein said first parameters indicate movement of a cursor on said display support facility, entry of a character at said event registration facility, or entry of a command at said event registration facility.

* * * * *

UNITED STATES PATENT AND TRADEMARK OFFICE
CERTIFICATE OF CORRECTION

PATENT NO. : 4,901,223

DATED : February 13, 1990

INVENTOR(S) : Rhyne

It is certified that error appears in the above-identified patent and that said Letters Patent is hereby corrected as shown below:

First page, TITLE, please delete "AND APPARATUS";

Column 1, line 2, please delete "AND APPARATUS";

Column 21, line 16, please change "time" to --times--; and

Column 22, line 2, please change second occurrence of "the" to --a--.

Signed and Sealed this

Fourth Day of December, 1990

Attest:

HARRY F. MANBECK, JR.

*Attesting Officer*     *Commissioner of Patents and Trademarks*